(12) United States Patent
Nagasaki et al.

(10) Patent No.: US 9,725,167 B2
(45) Date of Patent: Aug. 8, 2017

(54) UNMANNED HELICOPTER

(71) Applicant: YAMAHA HATSUDOKI KABUSHIKI KAISHA, Iwata-shi, Shizuoka (JP)

(72) Inventors: Yoshiki Nagasaki, Shizuoka (JP); Masanori Yoshihara, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 0 days.

(21) Appl. No.: 14/901,591

(22) PCT Filed: Jun. 26, 2014

(86) PCT No.: PCT/JP2014/067027
§ 371 (c)(1),
(2) Date: Dec. 28, 2015

(87) PCT Pub. No.: WO2014/208678
PCT Pub. Date: Dec. 31, 2014

(65) Prior Publication Data
US 2016/0368599 A1 Dec. 22, 2016

(30) Foreign Application Priority Data
Jun. 28, 2013 (JP) .................... 2013-137406

(51) Int. Cl.
*B64C 27/82* (2006.01)
*B64C 39/02* (2006.01)
*B64C 27/14* (2006.01)

(52) U.S. Cl.
CPC .............. *B64C 27/82* (2013.01); *B64C 27/14* (2013.01); *B64C 39/024* (2013.01); *B64C 2201/024* (2013.01)

(58) Field of Classification Search
CPC .................... B64C 27/82; B64C 2201/024
See application file for complete search history.

(56) References Cited

U.S. PATENT DOCUMENTS 731,813 A * 6/1903 Peteler ............. F16D 3/78
464/69
2,530,467 A 11/1950 Hunt
(Continued)

FOREIGN PATENT DOCUMENTS

CN 201148210 Y 11/2008
CN 202345913 U 7/2012
(Continued)

OTHER PUBLICATIONS

Vialle, M., "Tiger MGB High Reliability Low Weight", American Helicopter Society, 47th Annual Forum Proceedings, vol. 2, May 6-8, 1991, 23 pages.
(Continued)

Primary Examiner — Richard G Davis
(74) Attorney, Agent, or Firm — Keating and Bennett, LLP

(57) ABSTRACT

An unmanned helicopter includes a drive source, a tail rotor, a shaft unit that transmits a drive force from the drive source to the tail rotor, and an elastic member. The shaft unit includes a drive shaft, a transmission which transmits a drive force from the drive source to the drive shaft, and a transmittal portion that transmits a rotation torque from the drive shaft to the tail rotor. The drive shaft includes a first shaft portion and a second shaft portion. The elastic member is located between the first shaft portion and the second shaft portion.

7 Claims, 13 Drawing Sheets

(56) References Cited

U.S. PATENT DOCUMENTS

| | | | | |
|---|---|---|---|---|
| 2,679,148 | A | * | 5/1954 | Thrush ..................... F16D 3/78 464/93 |
| 5,360,376 | A | | 11/1994 | Baldino |
| 6,500,071 | B1 | * | 12/2002 | Pollard ..................... F16D 3/62 464/137 |
| 8,715,121 | B2 | * | 5/2014 | Cali ........................ F16D 3/02 474/94 |
| 2008/0220885 | A1 | * | 9/2008 | Muchingile ............... F16D 3/78 464/98 |
| 2009/0057481 | A1 | | 3/2009 | Lin |
| 2012/0283028 | A1 | * | 11/2012 | Abe ........................ F16D 3/78 464/69 |
| 2012/0298792 | A1 | | 11/2012 | Cardell et al. |
| 2016/0368599 | A1 | | 12/2016 | Nagasaki et al. |

FOREIGN PATENT DOCUMENTS

| | | | |
|---|---|---|---|
| GB | 2 092 542 | A | 8/1982 |
| JP | 60-126730 | U | 8/1985 |
| JP | 6-6876 | Y2 | 2/1994 |
| JP | 6-6877 | Y2 | 2/1994 |
| JP | 8-239100 | A | 9/1996 |
| JP | 10-16895 | A | 1/1998 |
| JP | 10016895 | A * | 1/1998 |
| JP | 2896349 | B2 | 5/1999 |
| JP | 4416642 | B2 | 2/2010 |
| JP | 5801851 | B2 | 10/2015 |
| WO | 2010/140933 | A1 | 12/2010 |

OTHER PUBLICATIONS

"Helicopter", Aeronautical Engineering Course, vol. 11, May 15, 2003, 6 pages.
"Boeing MH-47G", Flight International, Feb. 2013, 10 pages.
Marinucci, T., "US Army Special Operations Command MH-47G Special Operations Chinook", Boeing, Jun. 2013, 2 pages.
Kidachi, K. "Perdix Details of Drve Systems" 10 pages.
Official Communication issued in corresponding Japanese Patent No. 5801851, mailed on Apr. 26, 2016.
Official Communication issued in International Patent Application No. PCT/JP2014/067027, mailed on Sep. 22, 2014.

* cited by examiner

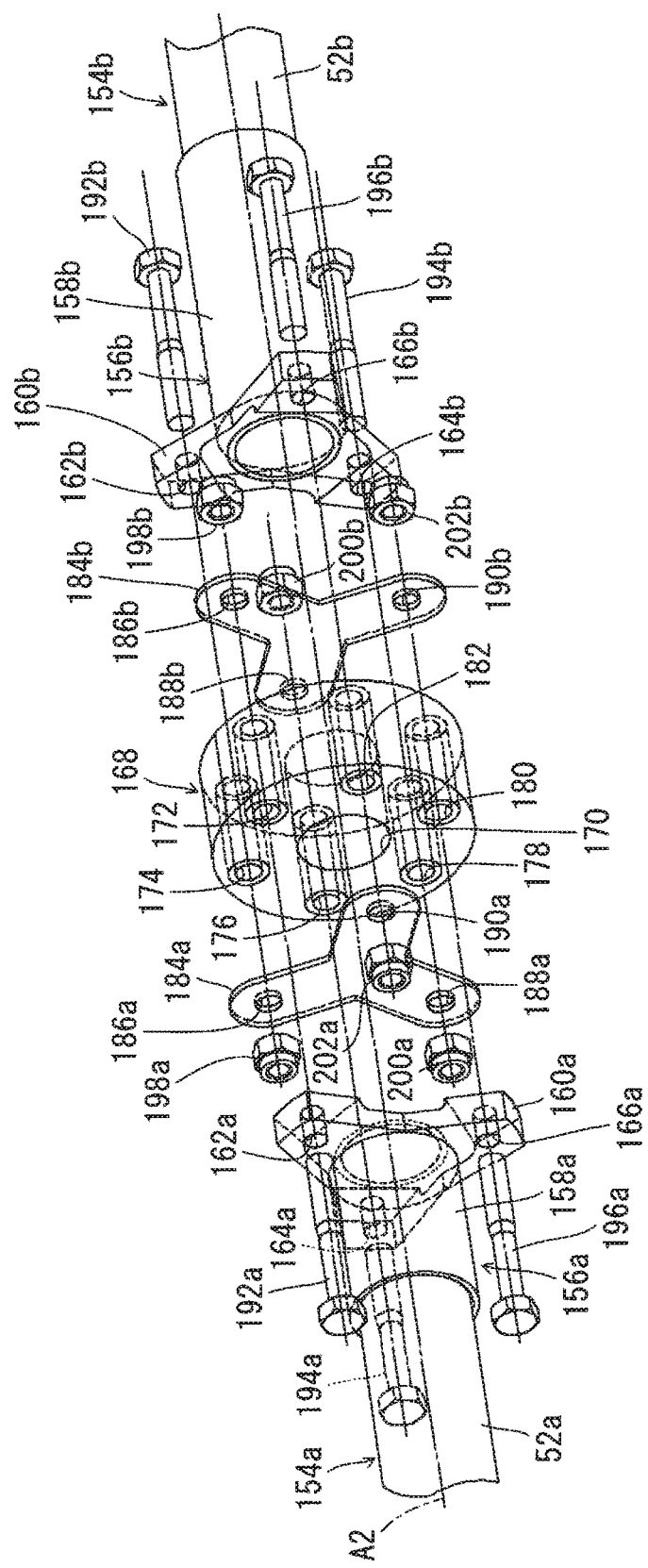

UNMANNED HELICOPTER

BACKGROUND OF THE INVENTION

1. Field of the Invention

The present invention relates to unmanned helicopters and more specifically to an unmanned helicopter including a drive shaft.

2. Description of the Related Art

An example of a conventional unmanned helicopter is disclosed in JP-Y H6-6876. JP-Y H6-6876 discloses an unmanned helicopter including a transmission shaft (drive shaft) that transmits a rotation torque to a tail rotor; a tail boom that supports the transmission shaft; and a cosmetic cover that covers an outer circumferential surface of the tail boom. In this arrangement, an elastic member is located between the outer circumferential surface of the tail boom and the cosmetic cover which opposes the tail boom.

An unmanned helicopter such as the one described above requires exact control on the number of rotations of the tail rotor to control the helicopter's attitude. In order to achieve this, a desired rotation torque must be transmitted to the tail rotor via the tail boom.

However, in the unmanned helicopter disclosed in JP-Y H6-6876, there can be a problem that if a high-frequency, high-amplitude variation in the number of rotations is caused in the transmission shaft by a hunting phenomenon from an engine rotational variation or the like when the tail rotor is rotated, a large rotation torque will result in the transmission shaft due to the variation in the number of rotations.

SUMMARY OF THE INVENTION

Therefore, preferred embodiments of the present invention provide an unmanned helicopter that reduces or prevents an increase in rotation torque in a drive shaft and transmits a desired number of rotations and rotation torque to a tail rotor even if a shaft unit includes a high-frequency, high-amplitude variation in a number of rotations when the tail rotor is rotated.

According to a preferred embodiment of the present invention, an unmanned helicopter includes a drive source; a tail rotor; a shaft unit that transmits a driving force from the drive source to the tail rotor; and an elastic member disposed in the shaft unit. In this helicopter, the shaft unit includes a drive shaft, a transmission that transmits a driving force from the drive source to the drive shaft, and a transmittal portion that transmits a rotation torque from the drive shaft to the tail rotor. Further, the elastic member is interposed in the shaft unit between a location between the transmission and the drive shaft and a location between the drive shaft and the transmittal portion.

According to a preferred embodiment of the present invention, the elastic member is provided in the shaft unit in an interposing manner. Therefore, even if a high-frequency, high-amplitude variation in the number of rotations occurs and an excessive rotation torque is caused in the shaft unit while the tail rotor is being rotated, the elastic member absorbs the rotation torque. This decreases the rotation torque that would occur in the shaft unit. In other words, it is possible to reduce or prevent an increase in the rotation torque of the drive shaft. Therefore, it is possible to transmit a desired number of rotations and rotation torque from the drive shaft to the tail rotor via the transmittal portion while reducing or preventing an excessive rotation torque.

Preferably, the unmanned helicopter further includes a bearing that does not include an inner ring and is disposed around an outer circumference of the drive shaft in direct contact with the drive shaft; and a tail body that covers the drive shaft and supports the drive shaft via the bearing. In this case, the drive shaft is supported by the tail body via a bearing which does not include an inner ring, such as a needle bearing, for example. When attached to an outer circumference of the drive shaft, the bearing is not fixed onto the drive shaft. Therefore, even if a high-frequency variation in the number of rotations in the drive shaft develops, it is possible to significantly reduce or prevent damage to a contact region between the bearing and the drive shaft. Also, the drive shaft is easily removed/attached from the bearing. This makes it easy to inspect/replace parts.

Further preferably, the unmanned helicopter further includes a housing provided around an outer circumference of the bearing and supported by the tail body. The housing includes a hole penetrating in an axial direction of the drive shaft. In this case, the drive shaft is supported by the tail body via the bearing and the housing. Therefore, it is possible to dispose the bearing at an appropriate position for assembling the drive shaft to the bearing. This makes it possible to assemble the drive shaft easily. Also, the hole in the housing makes it easy to perform maintenance on members disposed inside the tail body.

Further, preferably, the elastic member has a relationship between a displacement amount of the elastic member and a rotation torque outputted from the elastic member such that, as the displacement amount increases, the rotation torque increases toward a predetermined value in an asymptotic manner. In this case, the elastic member outputs rotation torques which have values lower than a predetermined value but does not output rotation torques which have values higher than the predetermined value. Therefore, even if an excessive rotation torque that is not smaller than the predetermined value is input from the drive source side, the elastic member does not output an excessive rotation torque to the tail rotor side. Thus, it is possible to reduce or prevent an increase in the rotation torque and transmit a desired rotation torque to the tail rotor. Also, if the predetermined value of the rotation torque is set to a slightly greater value than values in a normal operation range (of torques required to be transmitted during normal operation), then even if a torque in the normal operation range is a high-frequency torque, it is possible for the elastic member to output this torque to the tail rotor side.

Preferably, the drive shaft includes a first shaft portion and a second shaft portion, and the elastic member is located between the first shaft portion and the second shaft portion. In this case, the drive shaft preferably has a split construction. The first shaft portion and the second shaft portion are connected axially to each other via the elastic member. Therefore, it is possible to set an appropriate length for each of the first shaft portion and the second shaft portion to define the drive shaft. This makes it possible to support each shaft portion appropriately, and to control (rotational/bending) self-excited resonance vibration caused by (twisting/bending) rigidity of the drive shaft which is calculated from the transmitted torque.

Further preferably, the first shaft portion and the elastic member are connected to each other at a plurality of connection locations across or around a centerline of the drive shaft, the second shaft portion and the elastic member are connected to each other at a plurality of connection locations across or around the centerline of the drive shaft, and the first shaft portion, the second shaft portion and the elastic member have a relationship in which each of the plurality of connection locations between the first shaft portion and the elastic member is a first connection area, each of the plurality of connection locations between the second shaft portion and the elastic member is a second connection area, and the first connection area and the second connection area do not overlap each other when viewed from an axial direction of the drive shaft. If the first connection area and the second connection area overlap each other when viewed from the axial direction of the drive shaft, then the drive shaft is less flexible in a direction of an imaginary plane (within the plane) including the first connection area and the second connection area which overlap each other, and the drive shaft. To avoid this, as described above, the first connection area and the second connection area are offset from each other so that the first connection area and the second connection area do not overlap each other in a view from the axial direction of the drive shaft. By doing so, the drive shaft becomes flexible in any direction without being stiff in a specific direction. Therefore, even if the drive shaft receives an external force exerted from a direction perpendicular or substantially perpendicular to its axis, for example, the drive shaft flexes and absorbs the external force, and decreases the likelihood of damage to the drive shaft.

Further, preferably, the unmanned helicopter further includes a first plate portion provided on a main surface of the elastic member that faces the first shaft portion, and a second plate portion provided on a main surface of the elastic member that faces the second shaft portion. With the above arrangement, the first plate portion and the elastic member are connected to each other at a plurality of locations across or around the centerline of the drive shaft. Further, the second plate portion and the elastic member are connected to each other at a plurality of locations across or around the centerline of the drive shaft. The first plate portion and the second connection area overlap each other, and the second plate portion and the first connection area overlap each other in a view from the axial direction of the drive shaft. In this case, when viewed from the axial direction of the drive shaft, the first plate portion and the second connection area overlap each other. In the main surface of the elastic member that faces the first shaft portion, the first plate portion is attached to a different location from the first connection area. Also, when viewed from the axial direction of the drive shaft, the second plate portion and the first connection area overlap each other. In the main surface of the elastic member that faces the second shaft portion, the second plate portion is attached to a different location from the second connection area. By attaching the first plate portion and the second plate portion to the elastic member as described above, it becomes possible to reduce or prevent undesirable distortion of the elastic member.

Preferably, the drive source includes an engine. In cases where the drive source is an engine, there is a higher tendency that a high-frequency vibration is developed by variations in the number of engine rotations, for example, in the shaft unit. Therefore, the preferred embodiments of the present invention are suitably applicable to cases where the drive source includes an engine.

The above-described and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is an exploded perspective view showing a vicinity of connection areas between a drive shaft and an elastic member as another example.

DETAILED DESCRIPTION OF THE PREFERRED EMBODIMENTS

Figure 1:
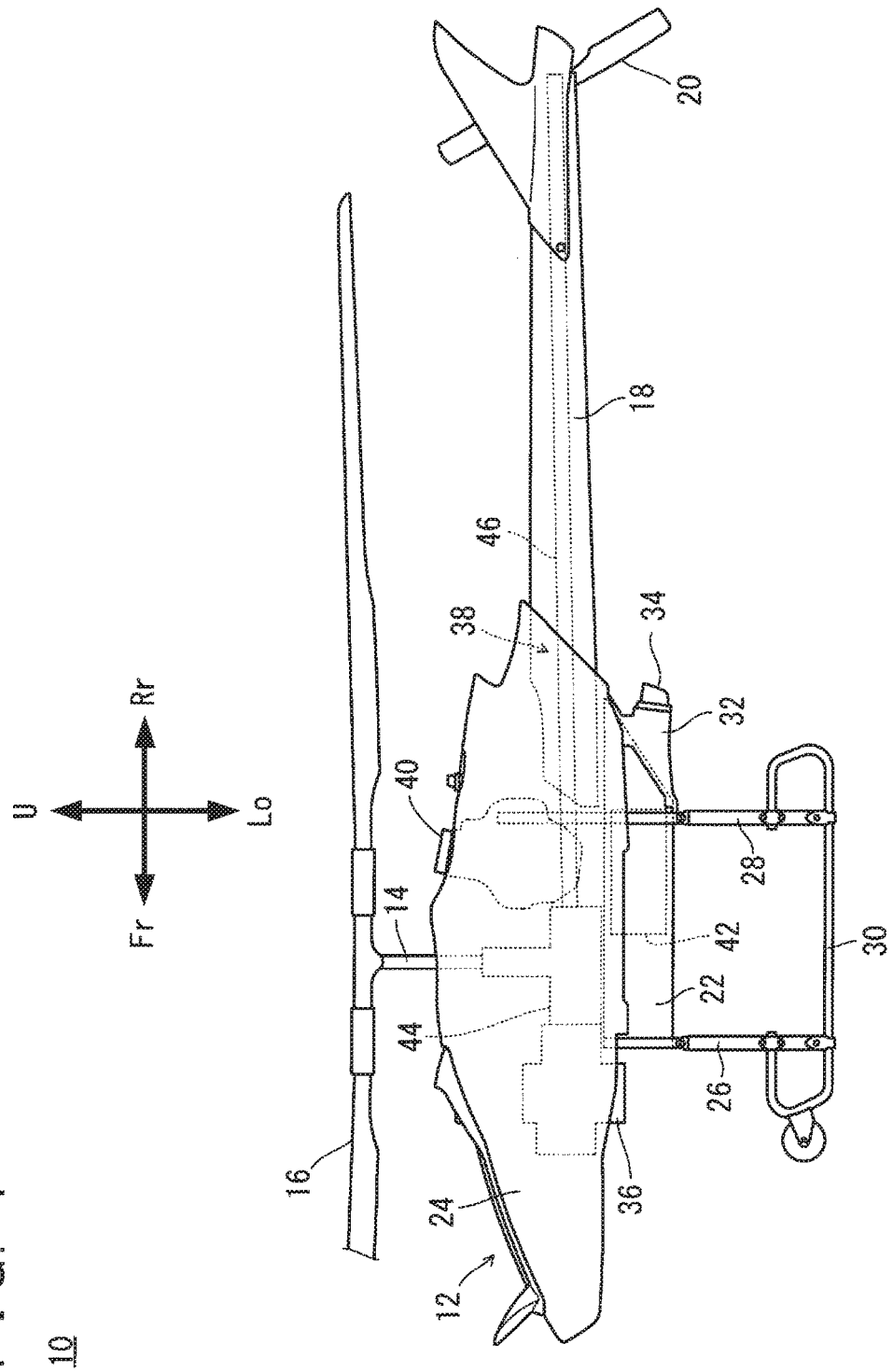
FIG. 1 is a side view showing an unmanned helicopter according to a preferred embodiment of the present invention.

Hereinafter, preferred embodiments of the present invention will be described with reference to the drawings. It is noted that the terms front and rear, left and right, up and down used in the preferred embodiments are determined from a basic attitude (which is an attitude of the helicopter 10 when its mast 14 is parallel to the vertical direction) of an unmanned helicopter 10 (hereinafter simply termed as helicopter 10). In FIG. 1, "Fr" means forward, "Rr" means rearward, "U" means upward, and "Lo" means downward.

Referring to FIG. 1, a helicopter 10 includes a main body 12, a mast 14, a main rotor 16, a tail body 18 and a tail rotor 20.

The main body 12 includes a main frame 22, a body cover 24, leg portions 26, 28, a pair of skids 30 (FIG. 1 shows only one skid 30 on the left side), and an under cover 32.

The tail body 18 and the body cover 24 are supported by the main frame 22.

Each of the leg portions 26 and 28 preferably has a shape of an inverted letter of U in a front view, and is supported by the main frame 22.

The pair of skids 30 are positioned side by side to each other, and attached to the leg portions 26 and 28. Specifically, the skid 30 on one side (left side) is attached to one side (left side) of the leg portions 26, 28, whereas the skid 30 (not illustrated) on the other side (right side) is attached to the other side (right side) of the leg portions 26, 28.

The under cover 32 is attached to the tail body 18 and the main frame 22.

The mast 14 protrudes upward from the body cover 24, and is rotatable. The mast 14 includes an upper end portion, where the main rotor 16 is fixed. Thus, the mast 14 and the main rotor 16 rotate integrally with each other. The tail body 18 is substantially cylindrical and extends rearward beyond the main body 12. The tail body 18 includes a forward end portion, which is supported by a rear end portion of the main frame 22 inside the body cover 24. The tail rotor 20 is rotatable, and is at a rearward end portion of the tail body 18.

Figure 2:
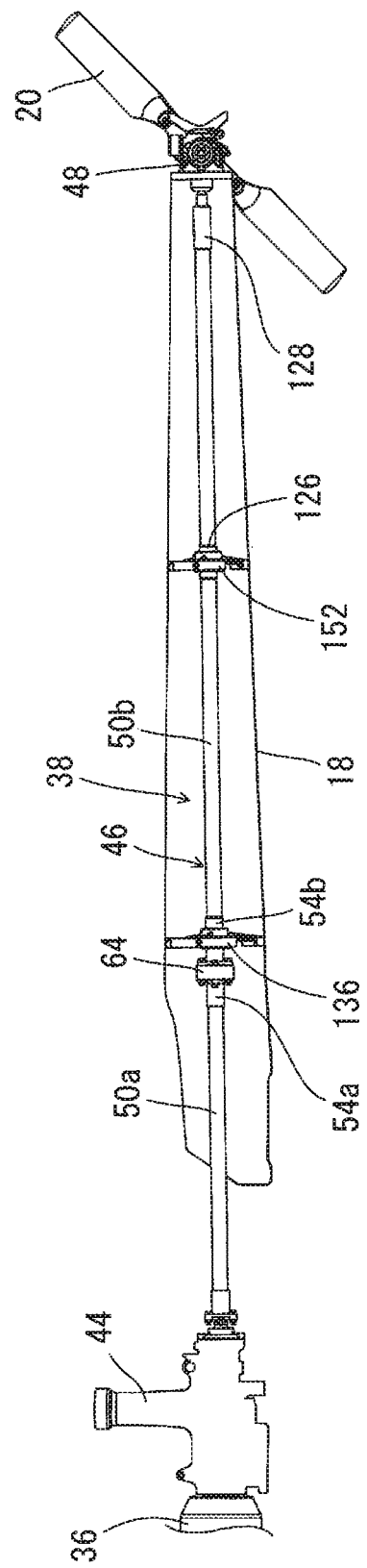
FIG. 2 is an illustrative side view of a shaft unit taken from a side (left side).
Figure 3:
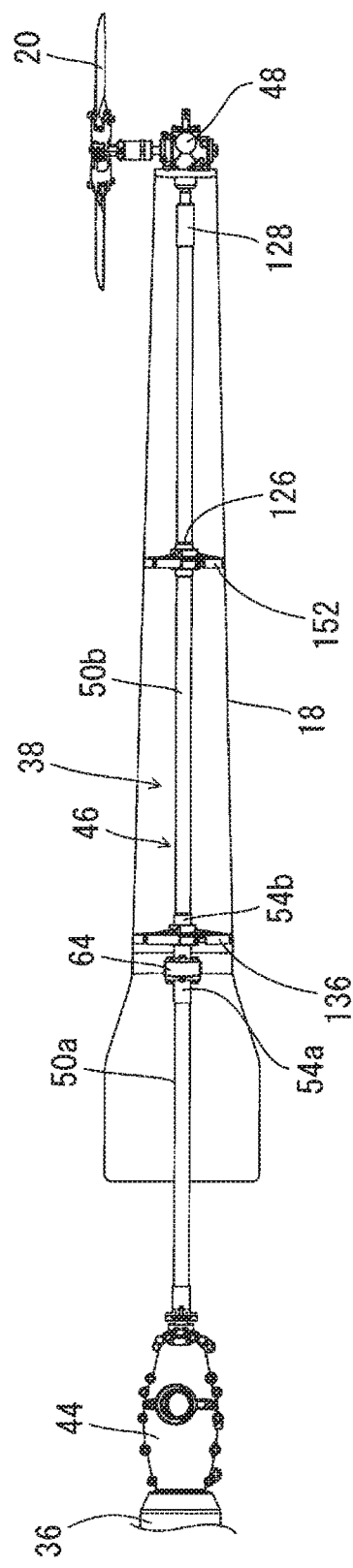
FIG. 3 is an illustrative plan view of the shaft unit taken from above.

The helicopter 10 further includes a display 34, a drive source 36, a shaft unit 38, a fuel tank 40, and an electric component box 42. Referring also to FIG. 2 and FIG. 3, the shaft unit 38 includes a transmission 44, a drive shaft 46, and a transmittal portion 48, and transmits a driving force from the drive source 36 to the tail rotor 20.

The fuel tank 40, the drive source 36, and the transmission 44 are housed in the body cover 24. The display 34 is held by the under cover 32. The electric component box 42 is located inside the main frame 22.

The drive source 36 is supported by a front end portion of the main frame 22 below the main rotor 16. In the present preferred embodiment, the drive source 36 includes an engine. More specifically, the drive source 36 includes, for example, a horizontally-opposed multi-cylinder engine.

The transmission 44 is supported by the main frame 22 behind the drive source 36. The transmission 44 is connected to an unillustrated crank shaft of the drive source 36. The transmission 44 is connected to a lower end portion of the mast 14. The main rotor 16 rotates due to a driving force transmitted from the drive source 36 via the transmission 44 and the mast 14. The fuel tank 40 is located behind the mast 14. The fuel tank 40 includes an upper end portion, which is exposed upward from the main body 12.

The drive shaft 46 extends rearward from the transmission 44. The drive shaft 46 extends in a fore-aft direction inside the main body 12 and inside the tail body 18. The tail rotor 20 is connected to a rear end portion of the drive shaft 46 via the transmittal portion 48. The tail rotor 20 rotates due to a driving force transmitted from the drive source 36 via the transmission 44, the drive shaft 46 and the transmittal portion 48.

Figure 4:
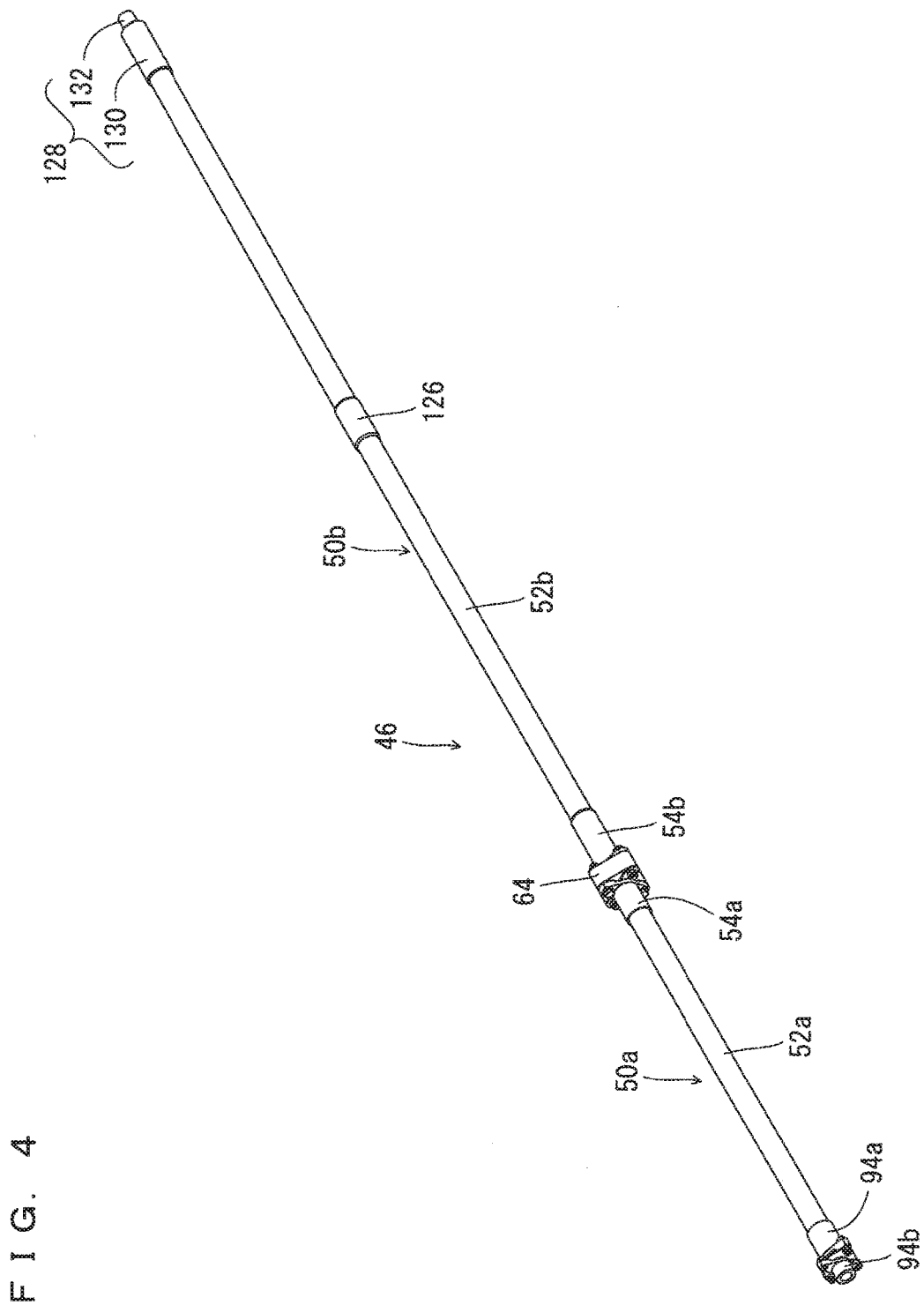
FIG. 4 is a perspective view showing a drive shaft with an elastic member interposed therein.

Referring to FIG. 4, the drive shaft 46 includes a first shaft portion 50a and a second shaft portion 50b. It is desirable for the drive shaft 46 to be made of a carbon fiber reinforced plastic, for example. In this case, it becomes possible to achieve a higher specific strength than in cases where the drive shaft 46 is made from other materials.

Figure 5:
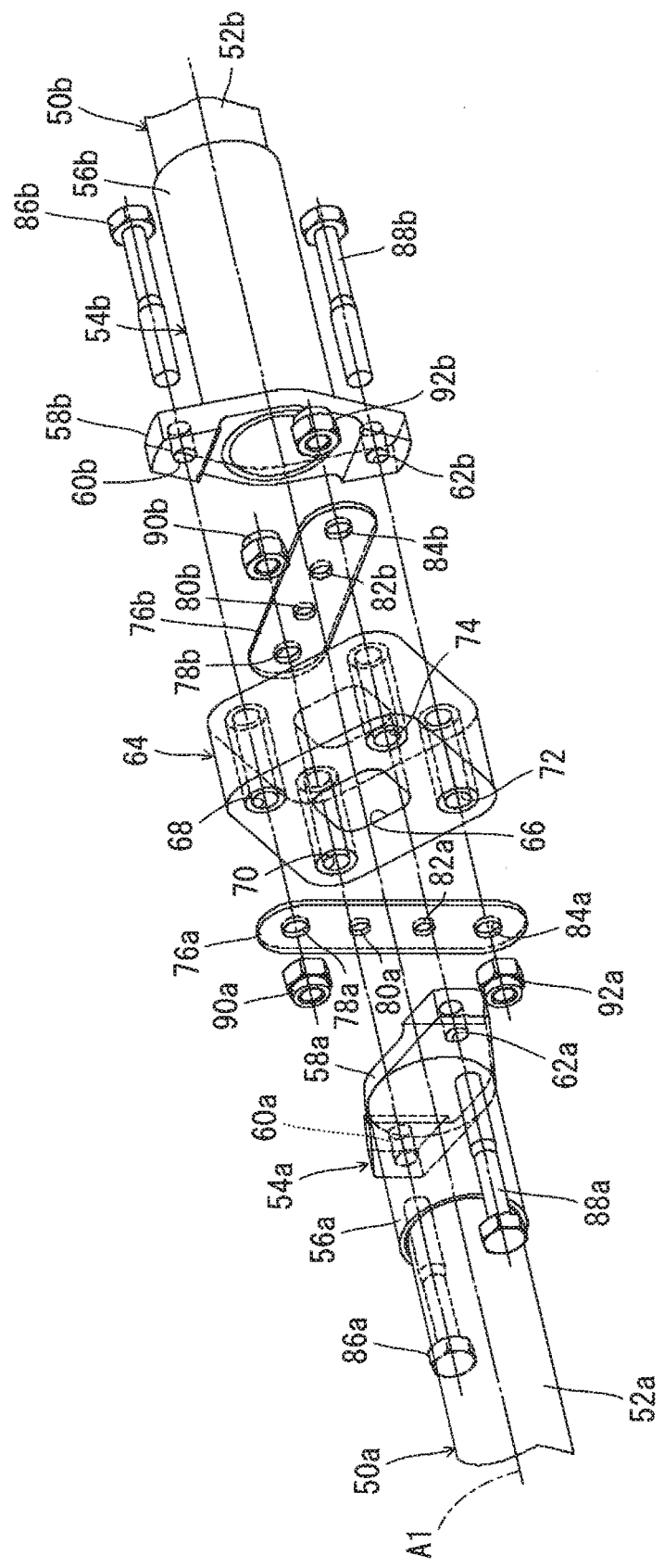
FIG. 5 is an exploded perspective view showing a vicinity of connection areas between the drive shaft and the elastic member.

Referring also to FIG. 5, the first shaft portion 50a includes a hollow cylindrical shaft main body 52a and a mounting portion 54a at an end portion of the shaft main body 52a near the second shaft portion 50b. The shaft main body 52a and the mounting portion 54a are made integral with each other by adhesion etc., for example. The mounting portion 54a preferably has a general shape of the letter T and includes a cylindrical portion 56a into which an end portion of the shaft main body 52a is fitted; a substantially I-shaped flange portion 58a provided at an end region of the cylindrical portion 56a so as to extend perpendicular or substantially perpendicular to an axial direction of the cylindrical portion 56a; and a plurality (two, for example, in the present preferred embodiment) of screw holes 60a, 62a provided at two end regions of the flange portion 58a. End regions of the flange portion 58a are preferably thicker than its intermediate region.

Likewise, the second shaft portion 50b includes a hollow cylindrical shaft main body 52b and a mounting portion 54b at an end portion of the shaft main body 52b near the first shaft portion 50a. The shaft main body 52b and the mounting portion 54b are made integral with each other by adhesion etc., for example. The mounting portion 54b preferably has a general shape of the letter T and includes a cylindrical portion 56b into which an end portion of the shaft main body 52b is fitted; a substantially I-shaped flange portion 58b provided at an end region of the cylindrical portion 56b so as to extend perpendicular or substantially perpendicular to an axial direction of the cylindrical portion 56b; and a plurality (two, for example, in the present preferred embodiment) of screw holes 60b, 62b provided at two end regions of the flange portion 58b. End regions of the flange portion 58b are preferably thicker than its intermediate region.

An elastic member 64 is provided between the first shaft portion 50a and the second shaft portion 50b. The elastic member 64 preferably has the shape of, for example, a quadrangular prism. The elastic member 64 includes, in its intermediate region, a substantially quadrangular prismatic through-hole 66 extending in an axial direction of the drive shaft 46; and through-holes 68, 70, 72, 74 extending in the axial direction of the drive shaft 46 around the through-hole 66 at four corners of the elastic member 64. The elastic member 64 is preferably made of a rubber material, for example. The same applies to elastic members 168, 220, 282 which will be described below.

A strip-shaped first plate portion 76a is disposed between the first shaft portion 50a and the elastic member 64. The first plate portion 76a includes a plurality (four, for example, in the present preferred embodiment) of through-holes 78a, 80a, 82a, 84a. The through-holes 78a, 84a are provided at locations corresponding to the through-holes 68, 72 of the elastic member 64. Likewise, a strip-shaped second plate portion 76b is disposed between the second shaft portion 50b and the elastic member 64. The second plate portion 76b includes a plurality (four, for example, in the present preferred embodiment) of through-holes 78b, 80b, 82b, 84b. The through-holes 78b, 84b are provided at locations corresponding to the through-holes 70, 74 of the elastic member 64.

With the above configuration, the first shaft portion 50a and the elastic member 64 are connected to each other with the first plate portion 76a there between, and the second shaft portion 50b and the elastic member 64 are connected to each other with the second plate portion 76b there between. In this process, a bolt 86a is inserted from a side of the first shaft portion 50a, through the screw hole 60a of the flange portion 58a, the through-hole 70 of the elastic member 64 and the through-hole 78b of the second plate portion 76b, and is tightened with a nut 90b, and a bolt 88a is inserted through the screw hole 62a of the flange portion 58a, the through-hole 74 of the elastic member 64 and the through-hole 84b of the second plate portion 76b, and is tightened with a nut 92b. Likewise, a bolt 86b is inserted from a side of the second shaft portion 50b, through the screw hole 60b of the flange portion 58b, the through-hole 68 of the elastic member 64 and the through-hole 78a of the first plate portion 76a, and is tightened with a nut 90a, and a bolt 88b is inserted through the screw hole 62b of the flange portion 58b, the through-hole 72 of the elastic member 64 and the through-hole 84a of the second plate portion 76a, and is tightened with a nut 92a.

As described above, the first shaft portion 50a and the elastic member 64 are connected to each other at a plurality (two, for example, in the present preferred embodiment) of locations across a centerline A1 of the drive shaft 46, and the second shaft portion 50b and the elastic member 64 are connected to each other at a plurality (two, for example, in the present preferred embodiment) of locations across the centerline A1 of the drive shaft 46. Each of the connection locations between the first shaft portion 50a and the elastic member 64 is a first connection area, each of the connection locations between the second shaft portion 50b and the elastic member 64 is a second connection area, and the first connection area and the second connection area do not overlap each other when viewed from the axial direction of the drive shaft 46. Specifically, the first connection area and the second connection area are arranged at an angle relative to each other by approximately 90 degrees in a circumferential direction of the drive shaft 46.

Also, the first plate portion 76a is provided on a main surface on the side of the first shaft portion 50a of the elastic member 64, and the second plate portion 76b is provided on a main surface on the side of the second shaft portion 50b of the elastic member 64. Further, the first plate portion 76a and the elastic member 64 are connected to each other at a plurality (two, for example, in the present preferred embodiment) of locations across the centerline A1 of the drive shaft 46, and the second plate portion 76b and the elastic member 64 are connected to each other at a plurality (two, for example, in the present preferred embodiment) of locations across the centerline A1 of the drive shaft 46. When viewed from the axial direction of the drive shaft 46, the first plate portion 76a and the second connection area overlap each other, and the second plate portion 76b and the first connection area overlap each other.

Figure 6:
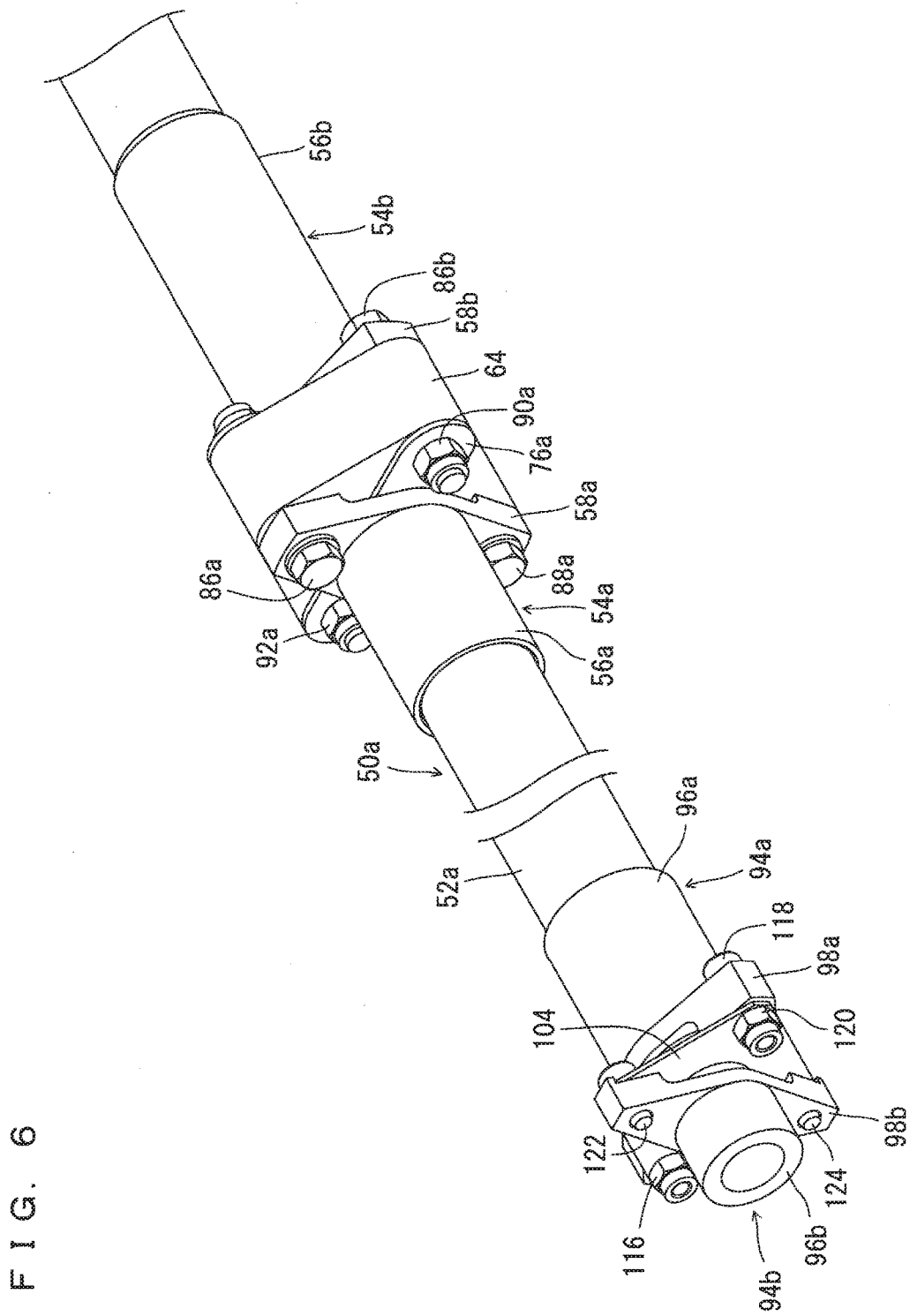
FIG. 6 is a perspective view showing two end regions of a first shaft portion.
Figure 7:
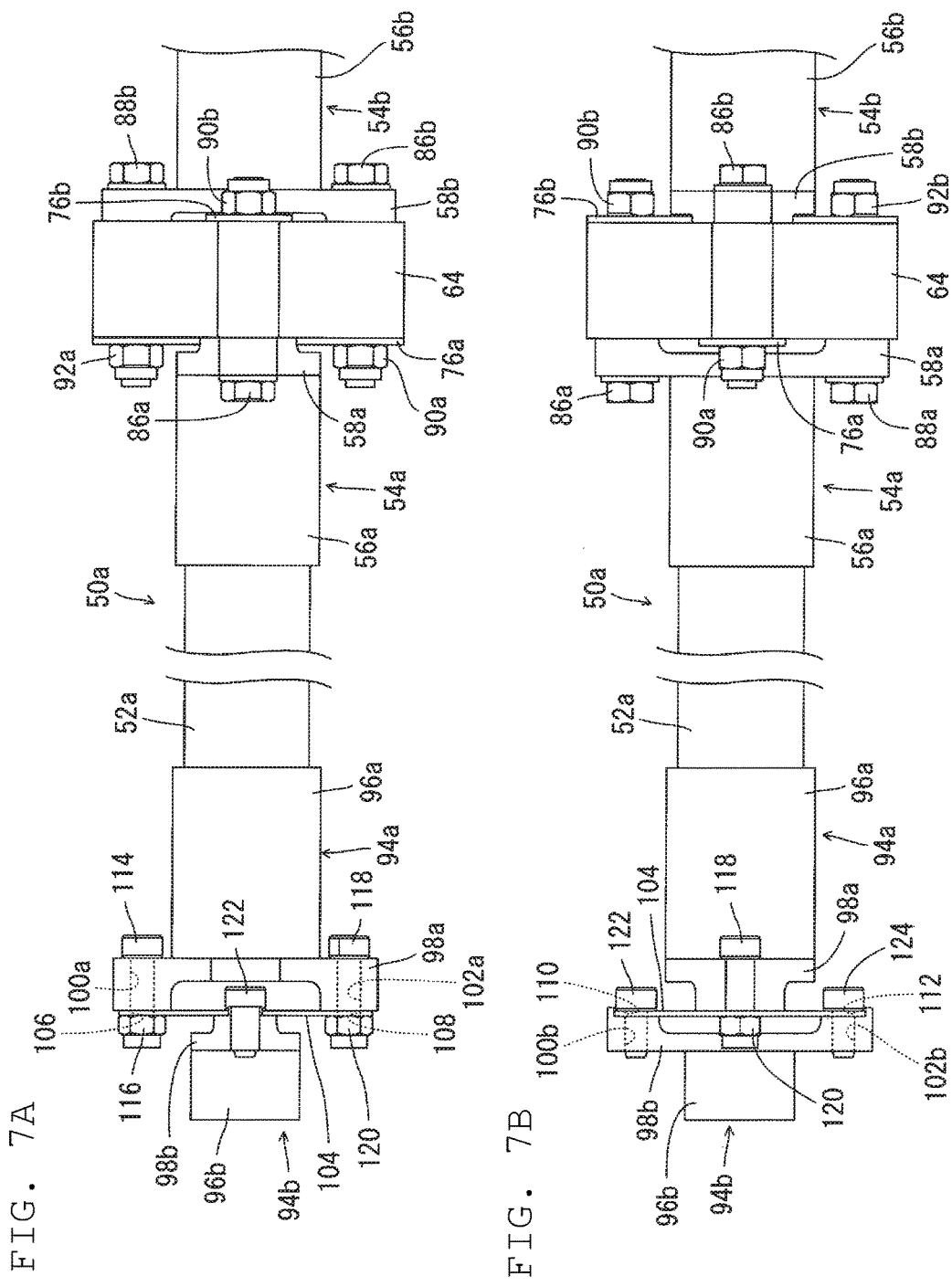
FIG. 7A is a plan view showing the two end regions of the first shaft portion.
FIG. 7B is a side view thereof.

Referring to FIG. 6 and FIG. 7, the first shaft portion 50a includes a mounting portion 94a at an end region on a side near the transmission 44 of the shaft main body 52a. The shaft main body 52a and the mounting portion 94a are made integral with each other by adhesion etc., for example. The mounting portion 94a preferably has a general shape of the letter T, and includes a cylindrical portion 96a into which another end portion of the shaft main body 52a is fitted; a substantially I-shaped flange portion 98a provided at an end region of the cylindrical portion 96a so as to extend perpendicular or substantially perpendicular to an axial direction of the cylindrical portion 96a; and a plurality (two, for example, in the present preferred embodiment) of screw holes 100a, 102a provided at two end regions of the flange portion 98a. End portions of the flange portion 98a are preferably thicker than an intermediate region thereof. The mounting portions 54a and 94a are attached to two end regions of the shaft main body 52a so that two end regions of each flange portion 58a and two end regions of the flange portion 98a do not overlap each other when viewed from the axial direction of the drive shaft 46. Specifically, the mounting portions 54a and 94a are arranged so that a longitudinal direction of the flange portion 58a and a longitudinal direction of the flange portion 98a are arranged at an angle of approximately 90 degrees in a circumferential direction of the drive shaft 46.

The mounting portion 94a is connected to a mounting portion 94b via a rectangular or substantially rectangular plate spring 104. The mounting portion 94b preferably has a general shape of the letter T, and includes a cylindrical portion 96b; a substantially I-shaped flange portion 98b provided at an end region of the cylindrical portion 96b so as to extend perpendicular or substantially perpendicular to an axial direction of the cylindrical portion 96b; and a plurality (two, for example, in the present preferred embodiment) of screw holes 100b, 102b provided at two end regions of the flange portion 98b. End portions of the flange portion 98b are preferably thicker than its intermediate region. The plate spring 104 includes through-holes 106, 108, 110, 112 corresponding to the screw holes 100a, 102a, 100b, 102b.

The plate spring 104 is disposed on an end surface of the flange portion 98a of the mounting portion 94a. A bolt 114 is then inserted through the screw hole 100a and the through-hole 106, and is tightened with a nut 116, and a bolt 118 is inserted through the screw hole 102a and the through-hole 108, and is tightened with a nut 120. In this state, the mounting portion 94b is attached to the plate spring 104, and in this process, a bolt 122 is inserted through the through-hole 110 in the plate spring 104, and threaded into the screw hole 100b of the flange portion 98b, and a bolt 124 is inserted through the through-hole 112 in the plate spring 104, and threaded into the screw hole 102b of the flange portion 98b. Therefore, the mounting portions 94a and 94b are arranged so that two end regions of the flange portion 98a and two end regions of the flange portion 98b do not overlap each other when viewed from the axial direction of the drive shaft 46. Specifically, the mounting portions 94a and 94b are arranged so that a longitudinal direction of the flange portion 98a and a longitudinal direction of the flange portion 98b are at an angle of approximately 90 degrees in a circumferential direction of the drive shaft 46.

Returning to FIG. 4, the second shaft portion 50b includes a cylindrical mounting portion 126 attached to a substantially intermediate region of the shaft main body 52b, and a mounting portion 128 attached to an end portion of the shaft main body 52b near the tail rotor 20. The mounting portion 128 includes a large pipe portion 130 attached to an end portion of the shaft main body 52b, and a small pipe portion 132 provided at an end region of the large pipe portion 130. The mounting portions 126 and 128 are preferably made integral with the shaft main body 52b by adhesion etc., for example.

Referring also to FIG. 2 and FIG. 3, in the drive shaft 46 as described above, the mounting portion 94b is connected to the transmission 44, and the mounting portion 128 is connected to the transmittal portion 48.

Figure 8:
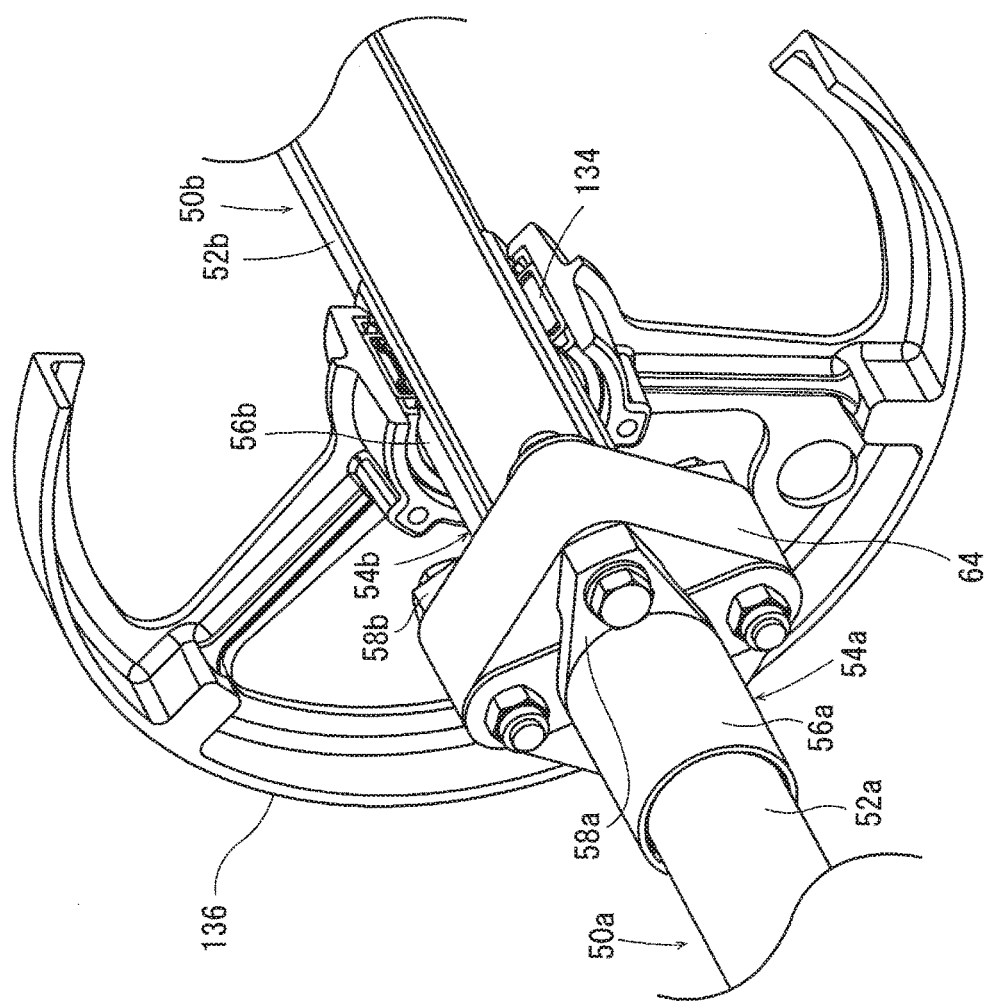
FIG. 8 is a perspective view showing a primary portion of a needle bearing attached to the drive shaft and a housing.
Figure 9:
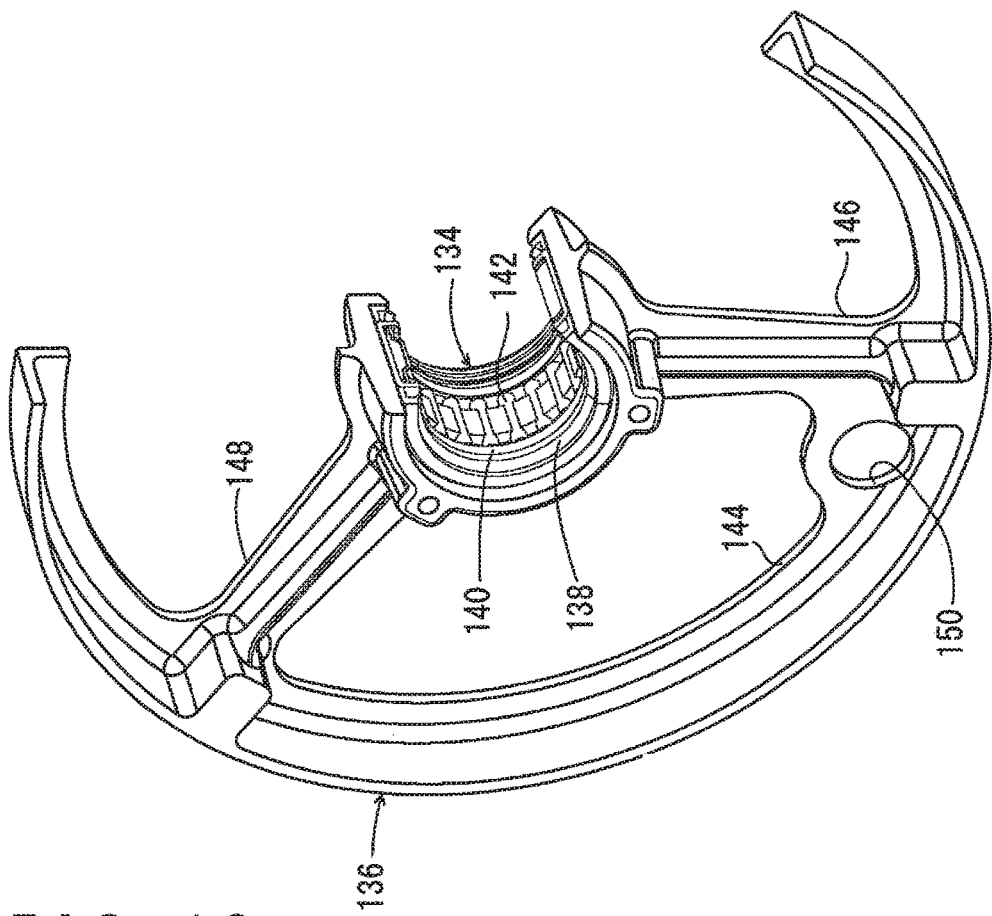
FIG. 9 is a perspective view showing a primary portion of the needle bearing and the housing.

Further, referring to FIG. 8 and FIG. 9, at the cylindrical portion 56b of the mounting portion 54b, a housing 136 is provided via a needle bearing 134. The housing 136 is attached to an inner surface of the tail body 18. The needle bearing 134 does not include an inner ring, but includes a cylindrical outer ring 138, a retainer section 140 on an inner surface of the outer ring 138, and a plurality of rod-shaped rollers 142 held by the retainer section 140. The rollers 142 are circumferentially spaced from each other, extend axially, and are rotatable. The cylindrical portion 56b of the mounting portion 54b is surrounded and contacted by the plurality of rollers 142, and is rotatable with respect to the needle bearing 134. The housing 136 is preferably annular or substantially annular, and connects the outer ring 138 of the needle bearing 134 and the tail body 18 to each other. The housing 136 includes axially penetrating through-holes 144, 146, 148, 150.

Returning to FIG. 2 and FIG. 3, a housing 152 is provided in the mounting portion 126 of the drive shaft 46 via a needle bearing (not illustrated). The housing 152 is preferably annular or substantially annular, and attached to an inner surface of the tail body 18. The housing 152 is smaller in its outer shape than the housing 136, but the housing 152 preferably has the same or substantially the same structure as the housing 136.

Next, the elastic member 64 will be described.

Figure 10:
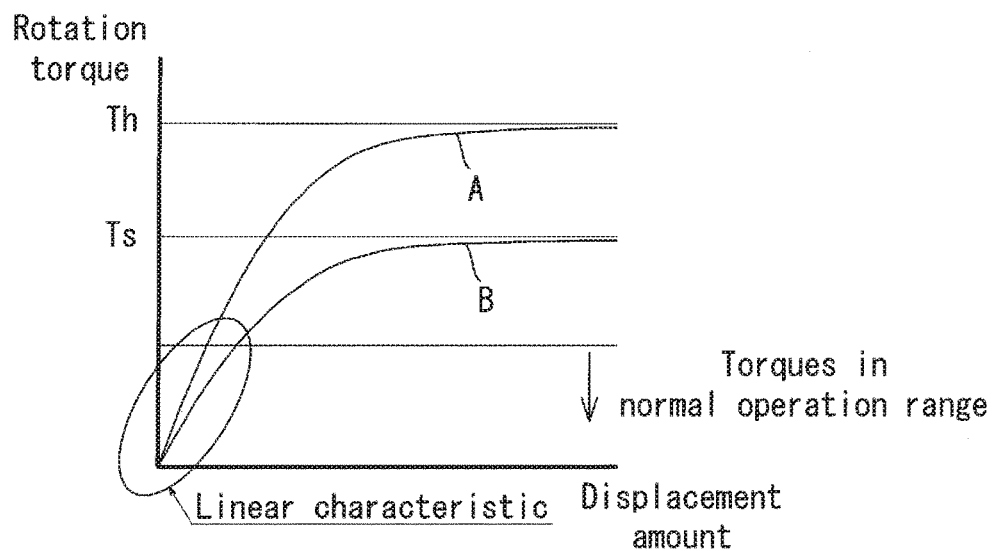
FIG. 10 is a graph showing a displacement amount vs. rotation torque characteristic of the elastic member.

FIG. 10 shows a relationship between a displacement amount of the elastic member 64 and a rotation torque outputted from the elastic member 64. As the displacement amount increases, the rotation torque increases toward a predetermined value in an asymptotic manner.

In FIG. 10, Line A shows a displacement amount vs. rotation torque characteristic when the elastic member has a relatively high hardness. The rotation torque outputted from the elastic member defines an asymptote to a predetermined value Th. Line B shows a displacement amount vs. rotation torque characteristic when the elastic member has a relatively low hardness. The rotation torque outputted from the elastic member defines an asymptote to a predetermined value Ts. Each of the predetermined values Th and Ts is set to a slightly greater value than values in a normal operation range (of torques required to be transmitted during normal operation). In the normal operation range of torques, both Lines A and B have a linear or substantially linear characteristic.

Figure 11A:
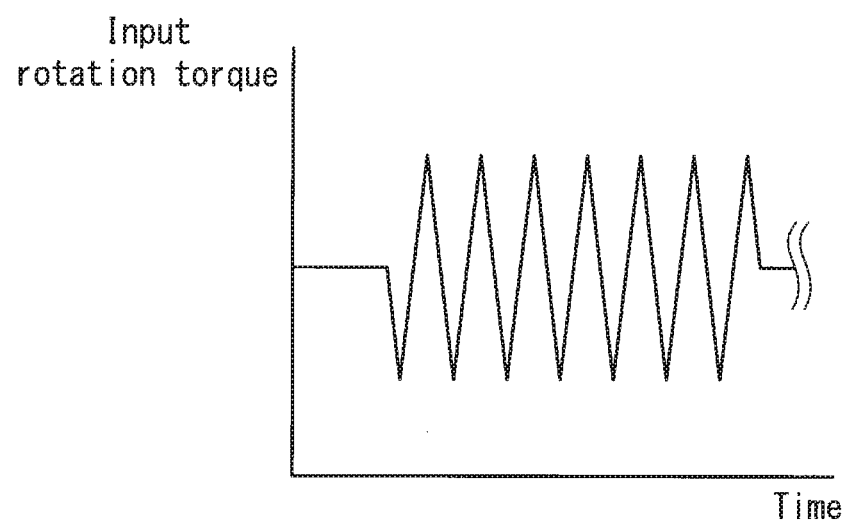
FIG. 11A is an illustrative drawing of an input rotation torque to the elastic member.
Figure 11B:
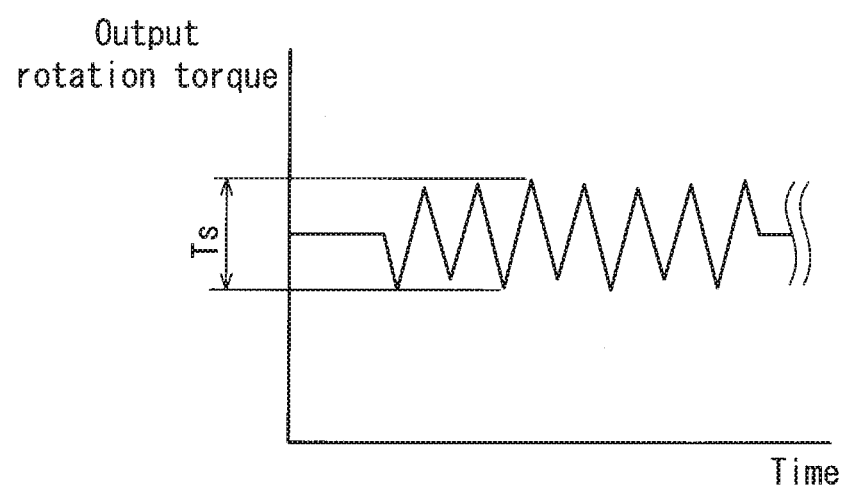
FIG. 11B is an illustrative drawing of an output rotation torque from the elastic member.

For example, assume that the elastic member, which has a Line B characteristic, is inserted between the first shaft portion 50*a* and the second shaft portion 50*b* of the drive shaft 46, and assume that a rotation torque as shown in FIG. 11A is inputted from the first shaft portion 50*a* to the elastic member. Then, as shown in FIG. 11B, the elastic member outputs a rotation torque which is smaller than the predetermined value Ts to the second shaft portion 50*b*. In other words, if the first shaft portion 50*a* and the second shaft portion 50*b* are connected to each other without using the elastic member, a rotation torque as shown in FIG. 11A is transmitted to the second shaft portion 50*b*.

Likewise, if the elastic member, which has a Line A characteristic, is inserted between the first shaft portion 50*a* and the second shaft portion 50*b* of the drive shaft 46, the elastic member outputs a rotation torque which is smaller than the predetermined value Th to the second shaft portion 50*b*.

According to the helicopter 10 described above, the elastic member 64 is provided in the shaft unit 38 in an interposing manner. Therefore, even if a high-frequency, high-amplitude variation in the number of rotations occurs and an excessive rotation torque is caused in the shaft unit 38 while the tail rotor 20 is being rotated, the elastic member 64 absorbs the rotation torque. This decreases a rotation torque which occurs in the shaft unit 38. In other words, it is possible to reduce or prevent an increase in the rotation torque in the drive shaft 46. Therefore, it is possible to transmit a desired number of rotations and rotation torque from the drive shaft 46 to the tail rotor 20 via the transmittal portion 48 while reducing or preventing the development of an excessive rotation torque.

The drive shaft 46 is supported by the tail body 18 via the needle bearing 134 which does not include an inner ring. The needle bearing 134 is not fixed to the drive shaft 46 when disposed around the outer circumference of the drive shaft 46. Therefore, even a high-frequency variation in the number of rotations in the drive shaft 46 is developed, it is possible to decrease the likelihood of damage to a contact region between the needle bearing 134 and the drive shaft 46. Also, the drive shaft 46 is easily removed/attached from the needle bearing 134. This makes it easy to inspect/replace parts.

The drive shaft 46 is supported by the tail body 18 via the needle bearing 134 and the housing 136. Therefore, it is possible to dispose the needle bearing 134 at an appropriate position to assemble the drive shaft 46 to the needle bearing 134. This makes it possible to assemble the drive shaft 46 easily. Also, the housing 136 is provided with the through-holes 144 through 150. This makes it easy to perform maintenance activities on members which are disposed inside the tail body 18, such as replenishing grease to a needle bearing (not illustrated) disposed at a more rearward location than the housing 136.

The elastic member 64 outputs rotation torques which have values smaller than a predetermined value but does not output rotation torques which have values not smaller than the predetermined value. Therefore, even if an excessive rotation torque which is not smaller than the predetermined value is provided from the drive source 36 side, the elastic member 64 does not output the excessive rotation torque to the tail rotor 20 side. Thus, it is possible to reduce or prevent an increase in the rotation torque and to transmit a desired rotation torque to the tail rotor 20. Also, if the predetermined value of the rotation torque is set to a slightly greater value than values in a normal operation range (of torques required to be transmitted during normal operation), then even if a torque in the normal operation range is a high-frequency torque, it is possible for the elastic member 64 to output the torque which is transmitted to the tail rotor 20 side.

The drive shaft 46 preferably has a split construction. The first shaft portion 50*a* and the second shaft portion 50*b* are connected axially to each other via the elastic member 64. Therefore, it is possible to set an appropriate length for each of the first shaft portion 50*a* and the second shaft portion 50*b* to define the drive shaft 46. This makes it possible to support the first shaft portion 50*a* and the second shaft portion 50*b* appropriately, and to control (rotational/bending) self-excited resonance vibration caused by (twisting/bending) rigidity of the drive shaft 46 which is calculated from the transmitted torque.

If the first connection area (connection locations between the first shaft portion 50*a* and the elastic member 64) and the second connection area (connection locations between the second shaft portion 50*b* and the elastic member 64) overlap each other when viewed from the axial direction of the drive shaft 46, then the drive shaft 46 becomes less flexible in a direction of an imaginary plane (within the plane) including the first connection area and the second connection area which overlap each other, and the drive shaft 46. To avoid this, the first connection area and the second connection area are offset from each other so that the first connection area and the second connection area do not overlap each other in a view from the axial direction of the drive shaft 46. By doing so, the drive shaft 46 becomes flexible in any direction, without a tendency that it is stiff in a specific direction. Therefore, even if the drive shaft 46 receives an external force exerted from a direction perpendicular or substantially perpendicular to its axis, for example, the drive shaft 46 flexes and absorbs the external force, and significantly reduces or eliminates the likelihood of damage occurring to the drive shaft 46.

When viewed from the axial direction of the drive shaft 46, the first plate portion 76*a* and the second connection area (connection locations between the second shaft portion 50*b* and the elastic member 64) overlap each other. In a main surface of the elastic member 64 which faces the first shaft portion 50*a*, the first plate portion 76*a* is attached to a different location from the first connection area (connection locations between the first shaft portion 50*a* and the elastic member 64). Also, when viewed from the axial direction of the drive shaft 46, the second plate portion 76*b* and the first connection area (connection locations between the first shaft portion 50*a* and the elastic member 64) overlap each other.

In a main surface of the elastic member 64 which faces the second shaft portion 50b, the second plate portion 76b is attached to a different location from the second connection area (connection locations between the second shaft portion 50b and the elastic member 64). By attaching the first plate portion 76a and the second plate portion 76b to the elastic member 64 as described above, it becomes possible to reduce or prevent undesirable distortion of the elastic member 64.

In cases where the drive source 64 is an engine, there is a higher tendency that high-frequency vibration is developed by the variation in the number of engine rotations, for example, in the shaft unit 38. Therefore, preferred embodiments of the present invention are suitably applicable to cases where the drive source 64 includes an engine.

Referring to FIG. 12, the drive shaft may include a first shaft portion 154a and a second shaft portion 154b, which are connected to each other via an elastic member 168 (to be described below).

The first shaft portion 154a includes a hollow cylindrical shaft main body 52a and a mounting portion 156a at an end portion of the shaft main body 52a near the second shaft portion 154b. The shaft main body 52a and the mounting portion 156a are made integral with each other by adhesion etc., for example. The mounting portion 156a includes a cylindrical portion 158a into which an end portion of the shaft main body 52a is fitted; a substantially Y-shaped flange portion 160a provided at an end region of the cylindrical portion 158a to extend in three directions perpendicularly or substantially perpendicularly to an axial direction of the cylindrical portion 158a; and a plurality (three, in the present preferred embodiment) of screw holes 162a, 164a, 166a provided at tip regions of the flange portion 160a. The flange portion 160a includes tip regions that are thicker than an intermediate region thereof.

Likewise, the second shaft portion 154b includes a hollow cylindrical shaft main body 52b and a mounting portion 156b at an end portion of the shaft main body 52b near the first shaft portion 154a. The shaft main body 52b and the mounting portion 156b are made integral with each other by adhesion etc., for example. The mounting portion 156b includes a cylindrical portion 158b into which an end region of the shaft main body 52b is fitted; a substantially Y-shaped flange portion 160b provided at an end region of the cylindrical portion 158b to extend in three directions perpendicular or substantially perpendicular to an axial direction of the cylindrical portion 158b; and a plurality (three, for example, in the present preferred embodiment) of screw holes 162b, 164b, 166b provided at tip regions of the flange portion 160b. Tip regions of the flange portion 160b are thicker than an intermediate region thereof.

An elastic member 168 is provided between the first shaft portion 154a and the second shaft portion 154b. The elastic member 168 is, for example, cylindrical or substantially cylindrical. The elastic member 168 includes, in its intermediate region, a cylindrical through-hole 170 extending in an axial direction of the drive shaft; and a plurality (six, for example, in the present preferred embodiment) of through-holes 172 through 182 extending in an axial direction of the drive shaft around the through-hole 170.

A substantially Y-shaped, platy first plate portion 184a is disposed between the first shaft portion 154a and the elastic member 168. The first plate portion 184a includes a plurality (three, for example, in the present preferred embodiment) of through-holes 186a, 188a, 190a. The through-holes 186a, 188a, 190a are provided at locations corresponding to the through-holes 174, 178, 182 of the elastic member 168.

Likewise, a substantially Y-shaped, platy second plate portion 184b is disposed between the second shaft portion 154b and the elastic member 168. The second plate portion 184b includes a plurality (three, for example, in the present preferred embodiment) of through-holes 186b, 188b, 190b. The through-holes 186b, 188b, 190b are provided at locations corresponding to the through-holes 172, 176, 180 of the elastic member 168.

With the above configuration, the first shaft portion 154a and the elastic member 168 are connected to each other with the first plate portion 184a there between, and the second shaft portion 154b and the elastic member 168 are connected to each other with the second plate portion 184b there between. In this process, from a side of the first shaft portion 154a, a bolt 192a is inserted through the screw hole 162a of the flange portion 160a, the through-hole 172 of the elastic member 168 and the through-hole 186b of the second plate portion 184b, and is tightened with a nut 198b; a bolt 194a is inserted through the screw hole 164a of the flange portion 160a, the through-hole 176 of the elastic member 168 and the through-hole 188b of the second plate portion 184b, and is tightened with a nut 200b; and a bolt 196a is inserted through the screw hole 166a of the flange portion 160a, the through-hole 180 of the elastic member 168 and the through-hole 190b of the second plate portion 184b, and is tightened with a nut 202b. Likewise, from a side of the second shaft portion 154b, a bolt 192b is inserted through the screw hole 162b of the flange portion 160b, the through-hole 174 of the elastic member 168 and the through-hole 186a of the first plate portion 184a, and is tightened with a nut 198a; a bolt 194b is inserted through the screw hole 164b of the flange portion 160b, the through-hole 178 of the elastic member 168 and the through-hole 188a of the first plate portion 184a, and is tightened with a nut 200a; and a bolt 196b is inserted through the screw hole 166b of the flange portion 160a, the through-hole 182 of the elastic member 168 and the through-hole 190a of the first plate portion 184a, and is tightened with a nut 202a.

As described above, the first shaft portion 154a and the elastic member 168 are connected to each other at a plurality (three, for example, in the present preferred embodiment) of locations around a centerline A2 of the drive shaft, and the second shaft portion 154b and the elastic member 168 are connected to each other at a plurality (three, for example, in the present preferred embodiment) of locations around the centerline A2 of the drive shaft. Each of the plurality of connection locations between the first shaft portion 154a and the elastic member 168 is a first connection area, each of the plurality of connection locations between the second shaft portion 154b and the elastic member 168 is a second connection area, and the first connection area and the second connection area do not overlap each other when viewed from the axial direction of the drive shaft. Specifically, the first connection area and the second connection area are at arranged an angle relative to each other by approximately 60 degrees in a circumferential direction of the drive shaft.

Also, the first plate portion 184a is provided on a main surface on the side of the first shaft portion 154a in the elastic member 168, and the second plate portion 184b is provided on a main surface on the side of the second shaft portion 154b in the elastic member 168. Further, the first plate portion 184a and the elastic member 168 are connected to each other at a plurality (three, for example, in the present preferred embodiment) of locations around the centerline A2 of the drive shaft, and the second plate portion 184b and the elastic member 168 are connected to each other at a plurality (three, for example, in the present preferred embodiment) of locations around the centerline A2 of the drive shaft. When viewed from the axial direction of the drive shaft, the first plate portion 184a and the second connection area overlap each other, and the second plate portion 184b and the first connection area overlap each other.

The present preferred embodiment in which the first shaft portion 154a and the second shaft portion 154b are connected as shown in FIG. 12 provides the same advantages as achieved by the preferred embodiment in FIG. 5, and it is also possible to alter the rotation torque vs. displacement amount characteristic.

Figure 13:
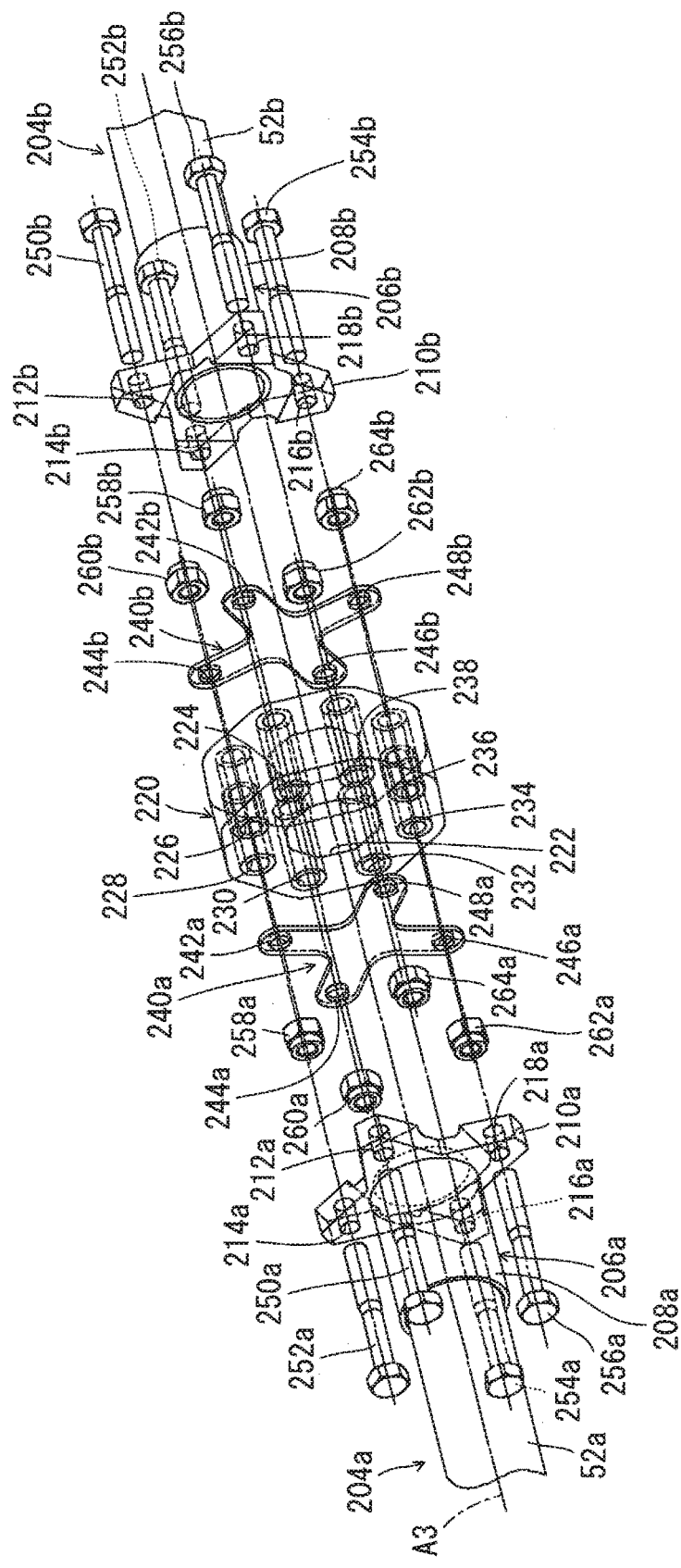
FIG. 13 is an exploded perspective view showing a vicinity of connection areas between a drive shaft and an elastic member as still another example.

Referring to FIG. 13, the drive shaft may include a first shaft portion 204a and a second shaft portion 204b, which are connected to each other via an elastic member 220 (which will be described below).

The first shaft portion 204a includes a hollow cylindrical shaft main body 52a and a mounting portion 206a at an end portion of the shaft main body 52a near the second shaft portion 204b. The shaft main body 52a and the mounting portion 206a are made integral with each other by adhesion etc., for example. The mounting portion 206a includes a cylindrical portion 208a into which an end portion of the shaft main body 52a is fitted; a substantially cross-shaped flange portion 210a provided at an end region of the cylindrical portion 208a to extend in four directions perpendicular or substantially perpendicular to an axial direction of the cylindrical portion 208a; and a plurality (four, for example, in the present preferred embodiment) of screw holes 212a, 214a, 216a, 218a provided at tip regions of the flange portion 210a. Tip regions of the flange portion 210a are thicker than an intermediate region thereof.

Likewise, the second shaft portion 204b includes a hollow cylindrical shaft main body 52b and a mounting portion 206b at an end portion of the shaft main body 52b near the first shaft portion 204a. The shaft main body 52b and the mounting portion 206b are made integral with each other by adhesion etc., for example. The mounting portion 206b includes a cylindrical portion 208b into which an end portion of the shaft main body 52b is fitted; a substantially cross-shaped flange portion 210b provided at an end region of the cylindrical portion 208b to extend in four directions perpendicular or substantially perpendicular to an axial direction of the cylindrical portion 208b; and a plurality (four, for example, in the present preferred embodiment) of screw holes 212b, 214b, 216b, 218b provided at tip regions of the flange portion 210b. Tip regions of the flange portion 210b are thicker than an intermediate region thereof.

The elastic member 220 is provided between the first shaft portion 204a and the second shaft portion 204b. The elastic member 220 preferably has, for example, the shape of an octagonal prism. The elastic member 220 includes, in its intermediate region, a substantially octagonal prismatic through-hole 222 extending in an axial direction of the drive shaft; and a plurality (eight, for example, in the present preferred embodiment) of through-holes 224 through 238 extending in an axial direction of the drive shaft around the through-hole 222.

A substantially cross-shaped, platy first plate portion 240a is disposed between the first shaft portion 204a and the elastic member 220. The first plate portion 240a includes a plurality (four, for example, in the present preferred embodiment) of through-holes 242a, 244a, 246a, 248a. The through-holes 242a, 244a, 246a, 248a are provided at locations corresponding to the through-holes 226, 230, 234, 238 of the elastic member 220. Likewise, a substantially cross-shaped, platy second plate portion 240b is disposed between the second shaft portion 204b and the elastic member 220.

The second plate portion 240b includes a plurality (four, for example, in the present preferred embodiment) of through-holes 242b, 244b, 246b, 248b. The through-holes 242b, 244b, 246b, 248b are provided at locations corresponding to the through-holes 224, 228, 232, 236 of the elastic member 220.

With the above configuration, the first shaft portion 204a and the elastic member 220 are connected to each other with the first plate portion 240a there between, and the second shaft portion 204b and the elastic member 220 are connected to each other with the second plate portion 240b there between. In this process, from the first shaft portion 204a side, a bolt 250a is inserted through the screw hole 212a of the flange portion 210a, the through-hole 224 of the elastic member 220 and the through-hole 242b of the second plate portion 240b, and is tightened with a nut 258b; and a bolt 252a is inserted through the screw hole 214a of the flange portion 210a, the through-hole 228 of the elastic member 220 and the through-hole 244b of the second plate portion 240b, and is tightened with a nut 260b. Further, a bolt 254a is inserted through the screw hole 216a of the flange portion 210a, the through-hole 232 of the elastic member 220 and the through-hole 246b of the second plate portion 240b, and is tightened with a nut 262b; and a bolt 256a is inserted through the screw hole 218a of the flange portion 210a, the through-hole 236 of the elastic member 220 and the through-hole 248b of the second plate portion 240b, and is tightened with a nut 264b. Likewise, from the second shaft portion 204b side, a bolt 250b is inserted through the screw hole 212b of the flange portion 210b, the through-hole 226 of the elastic member 220 and the through-hole 242a of the first plate portion 240a, and is tightened with a nut 258a; and a bolt 252b is inserted through the screw hole 214b of the flange portion 210b, the through-hole 230 of the elastic member 220 and the through-hole 244a of the first plate portion 240a, and is tightened with a nut 260a. Further, a bolt 254b is inserted through the screw hole 216b of the flange portion 210b, the through-hole 234 of the elastic member 220 and the through-hole 246a of the first plate portion 240a, and is tightened with a nut 262a; and a bolt 256b is inserted through the screw hole 218b of the flange portion 210b, the through-hole 238 of the elastic member 220 and the through-hole 248a of the first plate portion 240a, and is tightened with a nut 264a.

As described above, the first shaft portion 204a and the elastic member 220 are connected to each other at a plurality (four, for example, in the present preferred embodiment) of locations around a centerline A3 of the drive shaft, and the second shaft portion 204b and the elastic member 220 are connected to each other at a plurality (four, for example, in the present preferred embodiment) of locations around the centerline A3 of the drive shaft. Each of the plurality of connection locations between the first shaft portion 204a and the elastic member 220 is a first connection area, each of the plurality of connection locations between the second shaft portion 204b and the elastic member 220 is a second connection area, and the first connection area and the second connection area do not overlap each other when viewed from the axial direction of the drive shaft. Specifically, the first connection area and the second connection area are arranged at an angle relative to each other by approximately 45 degrees in a circumferential direction of the drive shaft.

Also, the first plate portion 240a is provided on a main surface on the side of the first shaft portion 204a in the elastic member 220, and the second plate portion 240b is provided on a main surface on the side of the second shaft portion 204b in the elastic member 220. Further, the first plate portion 240a and the elastic member 220 are connected to each other at a plurality (four, for example, in the present preferred embodiment) of locations around the centerline A3 of the drive shaft, and the second plate portion 240b and the elastic member 220 are connected to each other at a plurality (four, for example, in the present preferred embodiment) of locations around the centerline A3 of the drive shaft. When viewed from the axial direction of the drive shaft, the first plate portion 240a and the second connection area overlap each other, and the second plate portion 240b and the first connection area overlap each other.

The present preferred embodiment in which the first shaft portion 204a and the second shaft portion 204b are connected as shown in FIG. 13 provides the same advantages as achieved by the preferred embodiment in FIG. 5, and it is also possible to alter the rotation torque vs. displacement amount characteristic.

Figure 14:
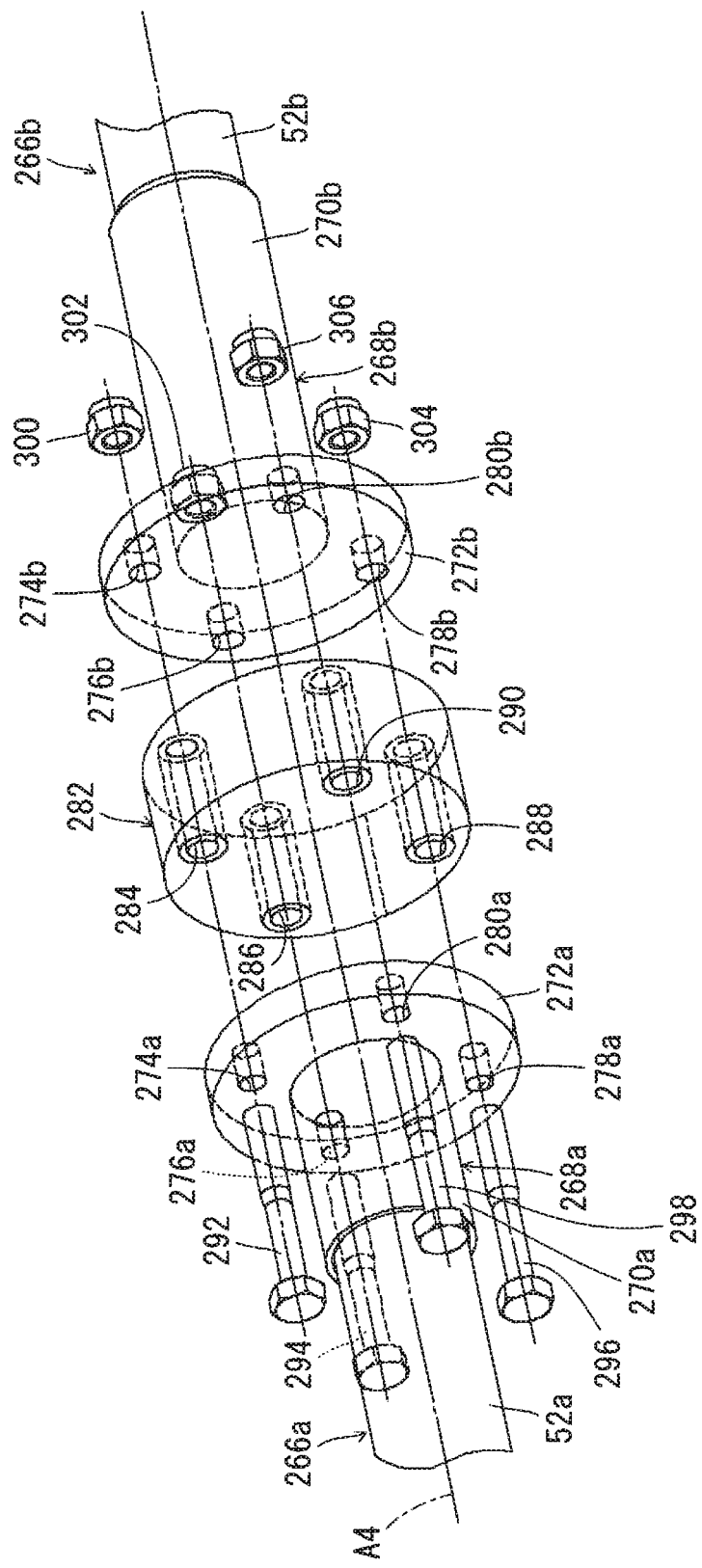
FIG. 14 is an exploded perspective view showing a vicinity of connection areas between a drive shaft and an elastic member as still another example.

Referring to FIG. 14, the drive shaft may include a first shaft portion 266a and a second shaft portion 266b, which are connected to each other via an elastic member 282 (which will be described below).

The first shaft portion 266a includes a hollow cylindrical shaft main body 52a and a mounting portion 268a at an end portion of the shaft main body 52a near the second shaft portion 266b. The shaft main body 52a and the mounting portion 268a are made integral with each other by adhesion etc., for example. The mounting portion 268a includes a cylindrical portion 270a into which an end portion of the shaft main body 52a is fitted; a disc-shaped flange portion 272a provided at an end region of the cylindrical portion 270a to extend perpendicular or substantially perpendicular to an axial direction of the cylindrical portion 270a; and a plurality (four, for example, in the present preferred embodiment) of screw holes 274a, 276a, 278a, 280a provided in the flange portion 272a.

Likewise, the second shaft portion 266b includes a hollow cylindrical shaft main body 52b and a mounting portion 268b at an end portion of the shaft main body 52b near the first shaft portion 266a. The shaft main body 52b and the mounting portion 268b are made integral with each other by adhesion etc., for example. The mounting portion 268b includes a cylindrical portion 270b into which an end portion of the shaft main body 52b is fitted; a disc-shaped flange portion 272b provided at an end region of the cylindrical portion 270b to extend perpendicular or substantially perpendicular to an axial direction of the cylindrical portion 270b; and a plurality (four, for example, in the present preferred embodiment) of screw holes 274b, 276b, 278b, 280b provided in the flange portion 272b.

An elastic member 282 is provided between the first shaft portion 266a and the second shaft portion 266b. The elastic member 282 is, for example, cylindrical or substantially cylindrical. The elastic member 282 includes a plurality (four, for example, in the present preferred embodiment) of through-holes 284 through 290 extending in the axial direction of the drive shaft.

With the above configuration, the first shaft portion 266a and the second shaft portion 266b are connected to each other with the elastic member 282 there between. In this process, from the first shaft portion 266a side, a bolt 292 is inserted through the screw hole 274a of the flange portion 272a, the through-hole 284 of the elastic member 282 and the screw hole 274b of the flange portion 272b, and is tightened with a nut 300, and a bolt 294 is inserted through the screw hole 276a of the flange portion 272a, the through-hole 286 of the elastic member 282 and the screw hole 276b of the flange portion 272b, and is tightened with a nut 302.

Further, a bolt 296 is inserted through the screw hole 278a of the flange portion 272a, the through-hole 288 of the elastic member 282 and the screw hole 278b of the flange portion 272b, and is tightened with a nut 304, and a bolt 298 is inserted through the screw hole 280a of the flange portion 272a, the through-hole 290 of the elastic member 282 and the screw hole 280b of the flange portion 272b, and is tightened with a nut 306.

As described above, the first shaft portion 266a and the elastic member 282 are connected to each other at a plurality (four, for example, in the present preferred embodiment) of locations around a centerline A4 of the drive shaft, and the second shaft portion 266b and the elastic member 282 are connected to each other at a plurality (four, for example, in the present preferred embodiment) of locations around the centerline A4 of the drive shaft.

The present preferred embodiment in which the first shaft portion 266a and the second shaft portion 266b are connected as shown in FIG. 14 provides the same advantages as achieved by the preferred embodiment in FIG. 5, and it is also possible to alter the rotation torque vs. displacement amount characteristic.

It should be noted here that the elastic member may be inserted anywhere in the shaft unit between a location between the transmission and the drive shaft and a location between the drive shaft and the transmittal portion.

The shape of the elastic member is not limited to those described above, and any appropriate shape may be selected in accordance with characteristics of the drive source, a desired number of rotations of the tail rotor, desired rotation torques, a desired normal torque range, etc. As an appropriate shape of the elastic member, an equilateral prismatic body, which includes an even number of side surfaces, in particular, is preferable.

The bearing is not limited to a needle bearing. Any bearing which does not include an inner ring and is attached around an outer circumference of the drive shaft to make direct contact with the drive shaft may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An unmanned helicopter comprising:
   a drive source;
   a tail rotor;
   a shaft unit that transmits a driving force from the drive source to the tail rotor;
   an elastic member disposed in the shaft unit;
   a bearing; and
   a tail body; wherein
   the shaft unit includes a drive shaft, a transmission that transmits a driving force from the drive source to the drive shaft, and a transmittal portion that transmits a rotation torque from the drive shaft to the tail rotor;
   the elastic member is interposed in the shaft unit between the transmission and the transmittal portion;
   the bearing does not include an inner ring and is disposed around an outer circumference of the drive shaft in direct contact with the drive shaft; and
   the tail body covers the drive shaft and supports the drive shaft via the bearing.

2. The unmanned helicopter according to claim 1, further comprising a housing provided around an outer circumference of the bearing and supported by the tail body; wherein the housing is annular; and the housing includes a hole that is located farther outward than the bearing in a radial direction of the housing and penetrates the housing in an axial direction of the drive shaft.

3. An unmanned helicopter comprising:

a drive source;

a tail rotor;

a shaft unit that transmits a driving force from the drive source to the tail rotor; and an elastic member disposed in the shaft unit; wherein the shaft unit includes a drive shaft, a transmission that transmits a driving force from the drive source to the drive shaft, and a transmittal portion that transmits a rotation torque from the drive shaft to the tail rotor;

the elastic member is interposed in the shaft unit between the transmission and the transmittal portion; and the elastic member has a relationship between a displacement amount of the elastic member and a rotation torque outputted from the elastic member such that, as the displacement amount increases, the rotation torque increases toward a predetermined value in an asymptotic manner.

4. An unmanned helicopter comprising:

a drive source;

a tail rotor;

a shaft unit that transmits a driving force from the drive source to the tail rotor; and an elastic member disposed in the shaft unit; wherein the shaft unit includes a drive shaft, a transmission that transmits a driving force from the drive source to the drive shaft, and a transmittal portion that transmits a rotation torque from the drive shaft to the tail rotor;

the elastic member is interposed in the shaft unit between the transmission and the transmittal portion; and the drive shaft includes a first shaft portion and a second shaft portion, and the elastic member is located between the first shaft portion and the second shaft portion.

5. The unmanned helicopter according to claim 4, wherein the first shaft portion and the elastic member are connected to each other at a plurality of locations across or around a centerline of the drive shaft, and the second shaft portion and the elastic member are connected to each other at a plurality of locations across or around the centerline of the drive shaft; and a connection location between the first shaft portion and the elastic member is a first connection area, a connection location between the second shaft portion and the elastic member is a second connection area, and the first connection area and the second connection area do not overlap each other when viewed from an axial direction of the drive shaft.

6. The unmanned helicopter according to claim 5, further comprising:

a first plate portion provided on a main surface of the elastic member which faces the first shaft portion; and a second plate portion provided on a main surface of the elastic member which faces the second shaft portion; wherein the first plate portion and the elastic member are connected to each other at a plurality of locations across or around the centerline of the drive shaft, and the second plate portion and the elastic member are connected to each other at a plurality of locations across or around the centerline of the drive shaft; and the first plate portion and the second connection area overlap each other, and the second plate portion and the first connection area overlap each other when viewed from the axial direction of the drive shaft.

7. The unmanned helicopter according to claim 6, wherein the drive source includes an engine.

* * * * *